United States Patent
Ray et al.

(10) Patent No.: US 8,982,871 B2
(45) Date of Patent: *Mar. 17, 2015

(54) SYSTEM AND METHOD FOR PROVIDING LOCATION INFORMATION TO A PUBLIC SAFETY ANSWERING POINT DURING AN EMERGENCY 911 CALL FROM A SOFTPHONE

(75) Inventors: Amar N. Ray, Shawnee, KS (US); Cadathur V. Chakravarthy, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 78 days.

This patent is subject to a terminal disclaimer.

(21) Appl. No.: 13/612,558

(22) Filed: Sep. 12, 2012

(65) Prior Publication Data

US 2013/0059560 A1 Mar. 7, 2013

Related U.S. Application Data

(63) Continuation of application No. 11/974,775, filed on Oct. 16, 2007, now Pat. No. 8,289,953.

(51) Int. Cl.
*H04J 3/24* (2006.01)
*H04L 12/66* (2006.01)
*H04L 12/28* (2006.01)
(Continued)

(52) U.S. Cl.
CPC ........... *H04M 3/5116* (2013.01); *H04L 45/306* (2013.01); *H04L 61/2015* (2013.01); *H04W 4/02* (2013.01); *H04L 67/22* (2013.01);
(Continued)

(58) Field of Classification Search
CPC ... H04L 45/306; H04L 61/2015; H04L 67/18; H04L 67/22; H04W 4/02; H04M 3/5116; H04M 3/42042; H04M 3/42348; H04M 7/006
USPC .................. 370/349, 352–356, 389, 392, 471; 455/521; 379/45
See application file for complete search history.

(56) References Cited

U.S. PATENT DOCUMENTS 5,339,351 A 8/1994 Hoskinson et al.
5,379,337 A 1/1995 Castillo et al.
(Continued)

OTHER PUBLICATIONS

U.S. Appl. No. 12/257,424; Non-Final Rejection dated Jul. 8, 2013; 46 pages.

(Continued)

*Primary Examiner* — Melanie Jagannathan
(74) *Attorney, Agent, or Firm* — Swanson & Bratschun, L.L.C.

(57) ABSTRACT

A system and method for providing location information to a public safety answering point from a softphone may include receiving, at a network access point, an emergency 911 call from the softphone. The emergency 911 call may be communicated to a public safety answering point. In response to a call connection message being received, an address location of the network access point to which the softphone is in communication in placing the emergency 911 call to the public safety answering point may be communicated in a type II caller ID data packet. The softphone may generate the type II caller ID data packet with the address location in a data field, such as a data field typically used for name information of a caller.

19 Claims, 6 Drawing Sheets

(51) Int. Cl.
  *H04J 3/16* (2006.01)
  *H04B 7/00* (2006.01)
  *H04M 11/04* (2006.01)
  *H04M 3/51* (2006.01)
  *H04L 12/725* (2013.01)
  *H04L 29/12* (2006.01)
  *H04W 4/02* (2009.01)
  *H04L 29/08* (2006.01)
  *H04M 3/42* (2006.01)
  *H04M 7/00* (2006.01)

(52) U.S. Cl.
  CPC .......... *H04L 67/18* (2013.01); *H04M 3/42042* (2013.01); *H04M 3/42348* (2013.01); *H04M 7/006* (2013.01)
  USPC .......... 370/349; 370/356; 370/392; 370/471; 455/521; 379/45

(56) References Cited

U.S. PATENT DOCUMENTS

| | | |
|---|---|---|
| 5,497,149 A | 3/1996 | Fast |
| 5,555,286 A | 9/1996 | Tendler |
| 5,646,987 A | 7/1997 | Gerber et al. |
| 5,937,038 A | 8/1999 | Bell et al. |
| 6,137,877 A | 10/2000 | Robin et al. |
| 6,240,285 B1 | 5/2001 | Blum et al. |
| 6,317,049 B1 | 11/2001 | Toubia et al. |
| 6,366,772 B1 | 4/2002 | Arnson |
| 6,415,018 B1 | 7/2002 | Antonucci et al. |
| 6,480,578 B1 | 11/2002 | Allport |
| 6,526,125 B1 | 2/2003 | Lindsey et al. |
| 6,591,112 B1 | 7/2003 | Siccardo et al. |
| 6,642,844 B2 | 11/2003 | Montague |
| 6,678,357 B2 | 1/2004 | Stumer et al. |
| 6,690,932 B1 | 2/2004 | Barnier et al. |
| 6,771,163 B2 | 8/2004 | Linnett et al. |
| 6,839,022 B1 | 1/2005 | Benco et al. |
| 7,026,925 B2 | 4/2006 | Roche et al. |
| 7,079,627 B2 | 7/2006 | Crago et al. |
| 7,095,733 B1 | 8/2006 | Yarlagadda et al. |
| 7,098,787 B2 | 8/2006 | Miller |
| 7,231,218 B2 | 6/2007 | Diacakis et al. |
| 7,269,413 B2 | 9/2007 | Kraft |
| 7,342,917 B2 | 3/2008 | Mohan et al. |
| 7,386,103 B1 | 6/2008 | Chahal |
| 7,418,087 B2 | 8/2008 | Luneau et al. |
| 7,496,189 B2 | 2/2009 | Clarisse et al. |
| 7,574,194 B2 | 8/2009 | Yang et al. |
| 7,679,505 B1 | 3/2010 | Vallaire |
| 7,706,356 B1 | 4/2010 | Olshansky et al. |
| 7,734,019 B1 | 6/2010 | Terpstra |
| 7,773,975 B2 | 8/2010 | Snapp et al. |
| 7,920,679 B1 | 4/2011 | Naim et al. |
| 7,991,135 B2 | 8/2011 | Rauba et al. |
| 8,014,341 B1 | 9/2011 | Ray |
| 8,102,986 B1 | 1/2012 | McClintock et al. |
| 8,295,801 B2 | 10/2012 | Ray et al. |
| 8,364,113 B2 | 1/2013 | Ray et al. |
| 8,447,267 B2 | 5/2013 | Ray et al. |
| 8,615,214 B2 | 12/2013 | Jain et al. |
| 8,630,609 B2 | 1/2014 | Ray et al. |
| 8,712,366 B2 | 4/2014 | Greene et al. |
| 8,718,595 B2 | 5/2014 | Ray et al. |
| 8,891,749 B2 | 11/2014 | Geldbach et al. |
| 8,923,803 B2 | 12/2014 | Ray et al. |
| 2001/0003843 A1 | 6/2001 | Scepanovic et al. |
| 2001/0004588 A1 | 6/2001 | Hong |
| 2001/0012379 A1 | 8/2001 | Amemiya et al. |
| 2002/0012323 A1 | 1/2002 | Petite et al. |
| 2002/0016189 A1 | 2/2002 | Sheynblat et al. |
| 2002/0054667 A1 | 5/2002 | Martinez |
| 2002/0136363 A1 | 9/2002 | Stumer et al. |
| 2003/0012344 A1 | 1/2003 | Agarwal et al. |
| 2003/0063714 A1 | 4/2003 | Stumer et al. |
| 2003/0109245 A1 | 6/2003 | McCalmont et al. |
| 2003/0133450 A1 | 7/2003 | Baum |
| 2003/0158668 A1 | 8/2003 | Anderson |
| 2004/0072583 A1 | 4/2004 | Weng |
| 2004/0077347 A1 | 4/2004 | Lauber et al. |
| 2004/0090950 A1 | 5/2004 | Lauber et al. |
| 2004/0176123 A1 | 9/2004 | Chin et al. |
| 2004/0257273 A1* | 12/2004 | Benco et al. ............... 342/357.1 |
| 2005/0002499 A1 | 1/2005 | Ordille et al. |
| 2005/0003797 A1 | 1/2005 | Baldwin |
| 2005/0070315 A1 | 3/2005 | Rai et al. |
| 2005/0101287 A1 | 5/2005 | Jin et al. |
| 2005/0111630 A1 | 5/2005 | Potorny et al. |
| 2005/0123102 A1 | 6/2005 | Beason et al. |
| 2005/0151642 A1 | 7/2005 | Tupler et al. |
| 2005/0159132 A1 | 7/2005 | Wright et al. |
| 2005/0169248 A1 | 8/2005 | Truesdale et al. |
| 2005/0197096 A1 | 9/2005 | Yang et al. |
| 2005/0201358 A1 | 9/2005 | Nelson et al. |
| 2005/0209781 A1 | 9/2005 | Anderson |
| 2005/0232225 A1 | 10/2005 | Pelaez et al. |
| 2005/0265326 A1 | 12/2005 | Laliberte |
| 2006/0009190 A1 | 1/2006 | Laliberte |
| 2006/0043164 A1* | 3/2006 | Dowling et al. ............... 235/375 |
| 2006/0052134 A1 | 3/2006 | Sato |
| 2006/0072547 A1 | 4/2006 | Florkey et al. |
| 2006/0133582 A1 | 6/2006 | McCulloch |
| 2006/0217136 A1 | 9/2006 | Bantukul et al. |
| 2006/0219542 A1 | 10/2006 | Savir |
| 2006/0234726 A1* | 10/2006 | Ashley et al. ............... 455/456.4 |
| 2006/0234727 A1 | 10/2006 | Ashley et al. |
| 2006/0293024 A1 | 12/2006 | Benco et al. |
| 2007/0003024 A1 | 1/2007 | Olivier et al. |
| 2007/0041368 A1 | 2/2007 | Lorello et al. |
| 2007/0064882 A1 | 3/2007 | Ger et al. |
| 2007/0121851 A1 | 5/2007 | Maropis et al. |
| 2007/0201391 A1 | 8/2007 | Belmonte et al. |
| 2007/0273519 A1 | 11/2007 | Ichikawa et al. |
| 2007/0280428 A1 | 12/2007 | McClelland |
| 2007/0287473 A1 | 12/2007 | Dupray |
| 2008/0018452 A1 | 1/2008 | McCarthy et al. |
| 2008/0026728 A1 | 1/2008 | Snapp et al. |
| 2008/0057944 A1 | 3/2008 | Miriyala et al. |
| 2008/0064363 A1 | 3/2008 | Salafia et al. |
| 2008/0064375 A1 | 3/2008 | Gottlieb |
| 2008/0070546 A1 | 3/2008 | Lee |
| 2008/0144779 A1 | 6/2008 | Ray et al. |
| 2008/0200143 A1* | 8/2008 | Qiu et al. ............... 455/404.2 |
| 2008/0261557 A1 | 10/2008 | Sim |
| 2008/0273670 A1 | 11/2008 | Dickinson |
| 2008/0304630 A1 | 12/2008 | Nguyen et al. |
| 2009/0047924 A1 | 2/2009 | Ray et al. |
| 2009/0086932 A1 | 4/2009 | Ray |
| 2009/0097474 A1 | 4/2009 | Ray et al. |
| 2009/0144260 A1 | 6/2009 | Bennett et al. |
| 2009/0186596 A1 | 7/2009 | Kaltsukis |
| 2009/0197567 A1 | 8/2009 | Ogram |
| 2009/0214011 A1 | 8/2009 | Geldbach et al. |
| 2009/0227225 A1 | 9/2009 | Mitchell et al. |
| 2009/0305730 A1 | 12/2009 | Herz et al. |
| 2009/0310602 A1 | 12/2009 | Olshansky et al. |
| 2010/0002845 A1 | 1/2010 | Zerillo et al. |
| 2010/0002846 A1 | 1/2010 | Ray et al. |
| 2010/0003946 A1 | 1/2010 | Ray et al. |
| 2010/0003947 A1 | 1/2010 | Ray et al. |
| 2010/0003949 A1 | 1/2010 | Ray et al. |
| 2010/0003954 A1 | 1/2010 | Ray et al. |
| 2010/0003955 A1 | 1/2010 | Ray et al. |
| 2010/0003961 A1 | 1/2010 | Ray et al. |
| 2010/0098062 A1 | 4/2010 | Croak et al. |
| 2010/0107192 A1 | 4/2010 | Sennett et al. |
| 2010/0142386 A1 | 6/2010 | Snapp et al. |
| 2010/0215153 A1 | 8/2010 | Ray et al. |
| 2010/0291894 A1 | 11/2010 | Pipes |
| 2011/0014923 A1 | 1/2011 | Krco et al. |
| 2011/0096769 A1 | 4/2011 | Sim |
| 2012/0214437 A1 | 8/2012 | Ray et al. |
| 2012/0309340 A1 | 12/2012 | Ray |

(56) References Cited

U.S. PATENT DOCUMENTS

| | | |
|---|---|---|
| 2013/0012156 A1 | 1/2013 | Ray et al. |
| 2013/0102269 A1 | 4/2013 | Ray et al. |
| 2013/0217355 A1 | 8/2013 | Ray et al. |
| 2013/0237181 A1 | 9/2013 | Ray |

OTHER PUBLICATIONS

U.S. Appl. No. 13/847,388; Non-Final Office Action dated Jul. 17, 2013; 54 pages.
U.S. Appl. No. 12/257,862; Non-Final Rejection dated Aug. 23, 2013; 29 pages.
U.S. Appl. No. 13/715,808; Notice of Allowance dated Sep. 13, 2013; 27 pages.
Dale N. Hatfield, "A Report on Technical and Operational Issues Impacting the Provision of Wireless Enhanced 911 Services," Federal Communications Commission, printed from the World Wide Web on May 8, 2006 (54 pages).
Ansi, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).
Micro Engineering Labs, Inc., "Caller ID," Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).
Dave Ryan & Asher Hazanchuk, "On-Hook & Off-Hook Caller ID Using DSP," Circuit Cellular INK# 83, Jun. 1997 (12 pages).
Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).
"AT&T Wireless Unleashes the First and Only Wireless Messaging Device," PhysOrg.com, Sep. 30, 2004; available online at URL: <http://www.physorg.com/news1392.html> (12 pages).
"NENA Recommended Generic Standards for E9-1-1 PSAP Equipment" NENA Technical Reference, NENA-04-001 Issue 2, Mar. 2001, 105 pages.
U.S. Appl. No. 11/430,232; Non-Final Rejection dated Jan. 19, 2011; 20 pages.
U.S. Appl. No. 11/430,232; Notice of Allowance dated May 13, 2011; 12 pages.
U.S. Appl. No. 11/430,232; Issue Notification dated Aug. 17, 2011; 1 page.
U.S. Appl. No. 11/640,714; Non-Final Rejection dated Mar. 17, 2011; 15 pages.
U.S. Appl. No. 11/640,714; Non-Final Rejection dated Sep. 15, 2011; 15 pages.
U.S. Appl. No. 11/640,714; Final Rejection dated Feb. 29, 2012; 17 pages.
U.S. Appl. No. 11/891,784; Notice of Allowance dated Jul. 18, 2012; 27 pages.
U.S. Appl. No. 11/891,784; Final Rejection dated Jan. 3, 2011; 18 pages.
U.S. Appl. No. 11/891,784; Non-Final Rejection dated Aug. 3, 2010; 13 pages.
U.S. Appl. No. 11/891,784; Issue Notification dated Sep. 26, 2012; 1 page.
U.S. Appl. No. 11/904,883; Non-Final Rejection dated Oct. 7, 2011; 19 pages.
U.S. Appl. No. 11/904,883; Non Final Rejection dated Oct. 11, 2012; 26 pages.
U.S. Appl. No. 11/904,883; Final Rejection dated Apr. 27, 2012; 16 pages.
U.S. Appl. No. 11/974,775; Issue Notification dated Sep. 26, 2012; 1 page.
U.S. Appl. No. 11/974,775; Corrected Notice of Allowability dated Aug. 31, 2012; 7 pages.
U.S. Appl. No. 11/974,775; Notice of Allowance dated Jun. 12, 2012; 15 pages.
U.S. Appl. No. 11/974,775; Notice of Allowance dated Apr. 27, 2012; 12 pages.
U.S. Appl. No. 11/974,775; Non-Final Rejection dated Nov. 7, 2011; 19 pages.
U.S. Appl. No. 11/974,775; Non-Final Rejection dated May 10, 2011; 24 pages.
U.S. Appl. No. 12/168,668; Non-Final Rejection dated Feb. 6, 2012; 21 pages.
U.S. Appl. No. 12/168,668; Final Rejection dated Jul. 11, 2012; 29 pages.
U.S. Appl. No. 12/070,909; Final Rejection dated Jan. 10, 2012; 9 pages.
U.S. Appl. No. 12/070,909; Non-Final Rejection dated Aug. 16, 2011; 13 pages.
U.S. Appl. No. 12/257,574; Final Rejection dated Dec. 29, 2011; 18 pages.
U.S. Appl. No. 12/257,574; Non-Final Rejection dated Jun. 6, 2011; 20 pages.
U.S. Appl. No. 12/257,574; Notice of Allowance dated Sep. 14, 2012; 25 pages.
U.S. Appl. No. 12/257,624; Final Rejection dated Jan. 31, 2012; 14 pages.
U.S. Appl. No. 12/257,624; Non-Final Rejection dated Oct. 6, 2011; 19 pages.
U.S. Appl. No. 12/257,641; Issue Notification dated Nov. 7, 2012; 1 page.
U.S. Appl. No. 12/257,641; Notice of Allowance dated Aug. 2, 2012; 17 pages.
U.S. Appl. No. 12/257,641; Notice of Allowance dated Feb. 2, 2012; 12 pages.
U.S. Appl. No. 12/257,641; Non-Final Rejection dated May 24, 2011; 17 pages.
U.S. Appl. No. 12/257,928; Non-Final Rejection dated Jun. 8, 2011; 21 pages.
U.S. Appl. No. 12/257,424; Final Rejection dated Jun. 13, 2012; 41 pages.
U.S. Appl. No. 12/257,424; Non Final Office Action dated Jan. 31, 2012; 21 pages.
U.S. Appl. No. 12/257,424; Non-Final Rejection dated Mar. 4, 2011; 20 pages.
U.S. Appl. No. 12/257,424; Final Rejection dated Jul. 14, 2011; 19 pages.
U.S. Appl. No. 12/257,862; Final Rejection dated Nov. 30, 2011; 15 pages.
U.S. Appl. No. 12/257,862; Non-Final Rejection dated May 24, 2011; 19 pages.
U.S. Appl. No. 12/272,238; Issue Notification dated Oct. 3, 2012; 1 page.
U.S. Appl. No. 12/272,238; Notice of Allowance dated Jun. 8, 2012; 21 pages.
U.S. Appl. No. 12/272,238; Pre-Brief Appeal Conference Decision dated Jan. 17, 2012; 2 pages.
U.S. Appl. No. 12/272,238; Notice of Appeal and Pre-Brief Conference Request dated Dec. 28, 2011; 6 pages.
U.S. Appl. No. 12/272,238; Final Rejection dated Sep. 29, 2011; 12 pages.
U.S. Appl. No. 12/272,238; Non-Final Rejection dated Mar. 28, 2011; 14 pages.
U.S. Appl. No. 12/257,655; Non-Final Rejection dated Apr. 1, 2011; 34 pages.
U.S. Appl. No. 12/257,416; Non-Final Rejection dated Mar. 3, 2011; 22 pages.
U.S. Appl. No. 12/257,640; Non-Final Rejection dated Mar. 17, 2011; 21 pages.
U.S. Appl. No. 13/460,507; Non-Final Rejection dated Aug. 16, 2012; 28 pages.
Federal Standard 1037C: Telecommunications: Glossary of Telecommunication Terms. National Communication System. Technology and Standards Division. Washington, DC: General Services Administration, Information Technology Service, 1996. pp. vii, A-28, H-7, O.
U.S. Appl. No. 12/257,574; Issue Notification dated Jan. 9, 2013; 1 page.

(56) References Cited

OTHER PUBLICATIONS

U.S. Appl. No. 12/391,503; Final Rejection dated May 24, 2012; 19 pages.
U.S. Appl. No. 12/391,503; Non Final Office Action dated Feb. 16, 2012; 9 pages.
U.S. Appl. No. 13/460,507; Final Rejection dated Dec. 20, 2012; 14 pages.
U.S. Appl. No. 13/614,585; Notice of Allowance dated Dec. 11, 2012; 30 pages.
U.S. Appl. No. 11/904,883; Non Final Rejection dated Apr. 19, 2013; 22 pages.
U.S. Appl. No. 12/257,862; Non Final Rejection dated Mar. 13, 2013; 30 pages.
U.S. Appl. No. 13/460,507; Non-Final Rejection dated Apr. 26, 2013; 19 pages.
U.S. Appl. No. 13/614,585; Issue Notification dated May 1, 2013; 1 page.
U.S. Appl. No. 13/715,808; Non-Final Rejection dated Apr. 9, 2013; 36 pages.
U.S. Appl. No. 12/257,424; Final Rejection dated Nov. 21, 2013; 34 pages.
U.S. Appl. No. 12/257,624; Non-Final Rejection dated Oct. 16, 2013; 38 pages.
U.S. Appl. No. 12/257,862; Notice of Allowance dated Dec. 6, 2013; 21 pages.
U.S. Appl. No. 12/257,928; Non-Final Rejection dated Nov. 20, 2013; 35 pages.
U.S. Appl. No. 12/391,503; Non Final Office Action dated Oct. 25, 2013; 23 pages.
U.S. Appl. No. 13/715,808; Issue Notification dated Dec. 24, 2013; 1 page.
U.S. Appl. No. 13/847,388; Non-Final Office Action dated Dec. 9, 2013; 34 pages.
U.S. Appl. No. 13/460,507; Notice of Allowance dated Dec. 20, 2013; 20 pages.
U.S. Appl. No. 11/640,714; Non-Final Rejection dated May 29, 2014; 50 pages.
U.S. Appl. No. 11/904,883; Non Final Rejection dated Jun. 10, 2014; 15 pages.
U.S. Appl. No. 12/070,909; Notice of Allowance dated Jul. 23, 2014; 33 pages.
U.S. Appl. No. 12/257,424; Notice of Allowance dated Aug. 11, 2014; 36 pages.
U.S. Appl. No. 12/257,624; Final Office Action dated May 13, 2014; 28 pages.
U.S. Appl. No. 12/257,928; Issue Notification dated Jun. 25, 2014; 1 page.
U.S. Appl. No. 12/391,503; Final Rejection dated Jun. 5, 2014; 39 pages.
U.S. Appl. No. 13/847,388; Non-Final Rejection dated Jul. 17, 2014; 39 pages.
U.S. Appl. No. 13/848,649; Non-Final Rejection dated Jul. 17, 2014; 21 pages.
U.S. Appl. No. 11/904,883; Non Final Rejection dated Feb. 5, 2014; 19 pages.
U.S. Appl. No. 12/257,424; Non-Final Rejection dated Apr. 17, 2014; 39 pages.
U.S. Appl. No. 12/257,862; Issue Notification dated Apr. 9, 2014; 1 page.
U.S. Appl. No. 12/257,928; Notice of Allowance dated Mar. 6, 2014; 20 pages.
U.S. Appl. No. 13/460,507; Issue Notification dated Apr. 16, 2014; 1 page.
U.S. Appl. No. 13/847,388; Final Rejection dated Apr. 7, 2014; 36 pages.
U.S. Appl. No. 11/640,714; Notice of Allowance dated Dec. 12, 2014; 41 pages.
U.S. Appl. No. 11/904,883; Notice of Allowance dated Oct. 8, 2014; 17 pages.
U.S. Appl. No. 12/070,909; Issue Notification dated Oct. 9, 2014; 1 page.
U.S. Appl. No. 12/168,668; Notice of Allowance dated Oct. 7, 2014; 31 pages.
U.S. Appl. No. 12/257,424; Issue Notification dated Dec. 10, 2014; 1 page.
U.S. Appl. No. 13/847,388; Final Rejection dated Dec. 4, 2014; 39 pages.

* cited by examiner

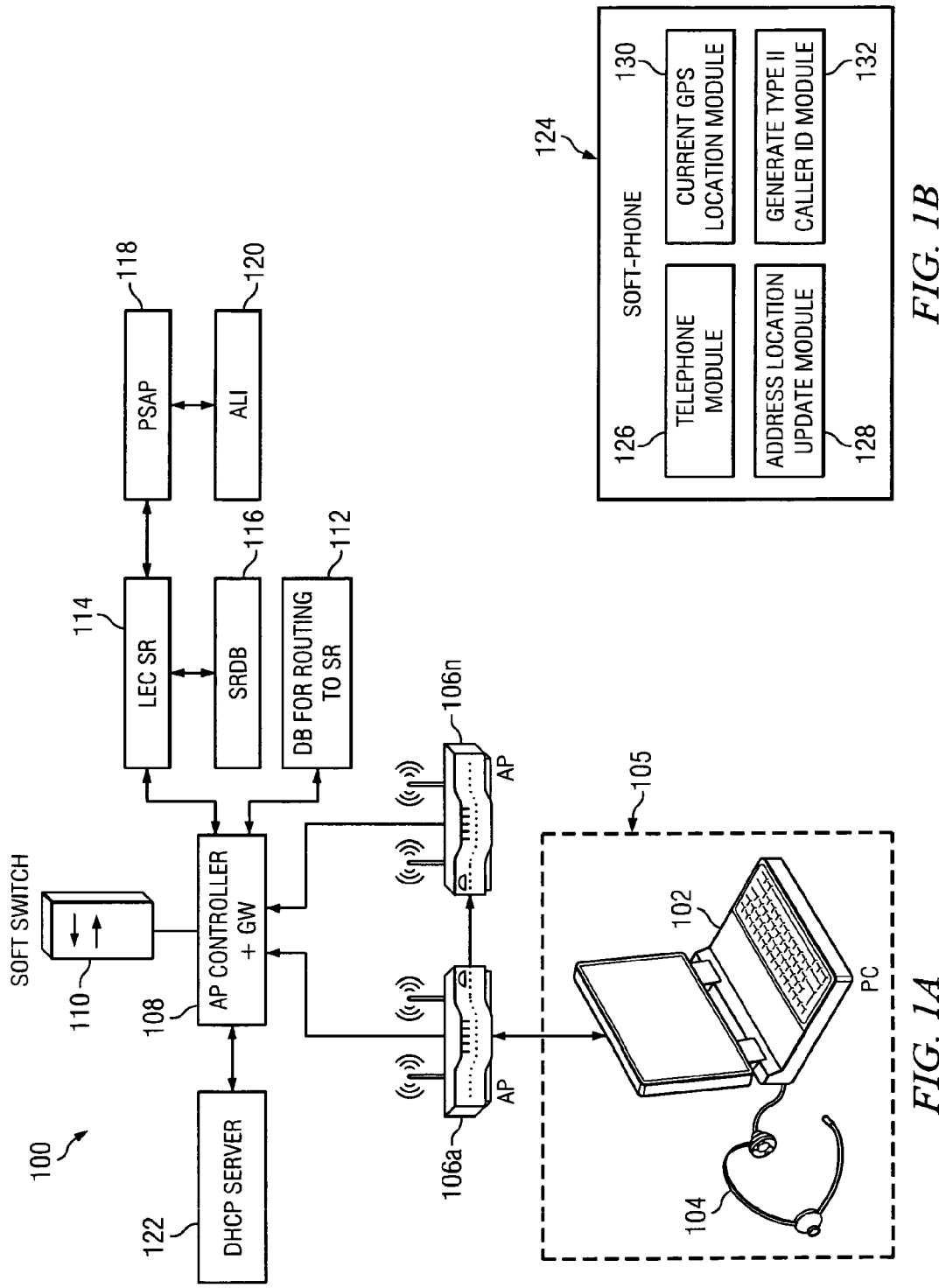

SYSTEM AND METHOD FOR PROVIDING LOCATION INFORMATION TO A PUBLIC SAFETY ANSWERING POINT DURING AN EMERGENCY 911 CALL FROM A SOFTPHONE

CROSS REFERENCE TO RELATED APPLICATION

This application is a continuation of U.S. patent application Ser. No. 11/974,775, filed Oct. 16, 2007 now U.S. Pat. No. 8,289,953 by Amar N. Ray et al. and entitled, "System and Method for Providing Location Information to a Public Safety Answering Point During an Emergency 911 Call from a Softphone," which is hereby incorporated by reference in its entirety.

BACKGROUND

The National Telecommunications Information Administration (NTIA) is the executive branch's advisory agency on telecommunications issues. In the early 1980s, this agency proposed a plan to raise awareness of a single emergency telephone number to the general public. From that program, the National Emergency Number Association (NENA), a non-profit organization, was created. NENA has since become a leading organization to improving technology and developing guidelines for 9-1-1 ("911") telephone calls (i.e., emergency telephone calls) to improve response by emergency rescue teams.

Telecommunications has been changing rapidly over the past several years, primarily since the development and growth of the mobile telephone industry and the Internet. New forms of telecommunications have been developing as well. Traditional telecommunications were performed over the public switch telephone network (PSTN). A system to maintain location of subscribers of telecommunications companies operating on the PSTN was developed. Determining the location of subscribers of the telecommunications companies was relatively easy as the locations of telephones were known by the telecommunications companies or carriers due to installing the telephones, establishing billing, or otherwise. However, with the new forms of telecommunications, subscribers are able to use wireless devices that may access different wireless access points to communicate over a communications network, such as the Internet. One common interface for wireless access to a communications network includes an IEEE 802.11 communications protocol, which is commonly known by the brand name WiFi. Wireless devices are being configured to have WiFi communications protocols to enable a subscriber to access WiFi enabled access points. Many WiFi enabled wireless devices have global positioning system (GPS) capabilities that are able to communicate GPS location information (i.e., latitude and longitude coordinates) of the WiFi enabled device. While GPS location information may be helpful to track or locate a person at a precise geographical location, such information is not extremely useful in an emergency situation where emergency rescue teams, such as firemen and police, better understand address information for performing an emergency rescue in an emergency situation.

A softphone is commonly understood to mean a software application that is executed by a computing device for initiating and communicating voice calls using voice over Internet Protocol (VoIP) or other protocol. The number of softphone users is growing due to advancement of broadband and WiFi technology.

As understood in the art, DHCP servers are used to manage IP addresses. The DHCP servers ensure that no two computers or devices use the same IP address. Because softphones operate on computing devices and each computing device has an associated IP address, each softphone is associated with a unique IP address.

A public safety answering position (PSAP) is used by emergency services to answer calls from the public to notify emergency personnel, such as police or firemen, to respond to an emergency situation. Traditionally, a caller would contact a PSAP and provide location information during the telephone call. When caller identification (i.e., caller ID) was introduced, PSAPs were installed with telephone systems compatible with caller ID to identify names and phone numbers of individuals placing emergency 911 calls. This first version of caller ID is known as type I caller ID. Type I caller ID operates in a single data message format (SDMF) as well as multiple data message format (MDMF) that provide a caller's telephone number, date and time of the call during the ringing interval.

A second type of caller ID or type II caller ID was later developed to communicate name and address information of a second calling party to a called party when a call between a called party and a first calling party is in progress. Type II caller ID uses a multiple data message format (MDMF) that communicates a caller's name, telephone number, date and time. Enhanced 911 is a North American Telephone Network (NATN) feature of the 911-emergency-calling system that uses a reverse telephone directory provided by cellular telephone companies to determine location information of a caller.

There are two types of E911 systems that operate within the United States, Phase I and Phase II. E911 Phase I systems are required to provide an operator with the telephone number, originator, and location of the cell site or base station receiving a 911 call. E911 Phase II systems are required to use an automatic location identification (ALI). However, only 18% of all PSAPs are configured with E911 Phase II systems. The remaining 82% of PSAPs are configured with E911 Phase I systems, which are incapable of handling GPS coordinates, and, therefore, subscribers who have wireless telephones that use GPS coordinates for 911 emergency calls cannot be properly serviced by these PSAPs. If a caller is using a non-cellular wireless device, such as a WiFi enabled wireless device (e.g., softphone), an operator at a PSAP with E911 Phase I capabilities is unable to determine address location based on GPS coordinates that are received from the caller. As softphones are often used in laptop computers that are moved from one network access point, such as a WiFi access point, to another, emergency 911 calls may be placed from locations other than a user's home. Many newer laptop computers are installed with GPS capabilities to be used for certain applications, such as an emergency 911 calls. Softphones with GPS capabilities suffer from the limitations described above. Furthermore, there is currently no solution for softphone that connect to wireless network access points in handling emergency 911 calls.

SUMMARY

To enable softphone with emergency 911 capabilities, the principles of the present invention provide for softphones to store current address locations and communicate the current address locations when communicating with a public safety answering point. The softphone may generate a type II caller ID data packet and include the current address location in the type II caller ID data packet in by placing the current address location in a name field so that the address location information may be displayed at the public safety answering point. As the softphone is moved between network access points, a DHCP server that determines that the softphone has a new location or IP address may notify the softphone to update the current address location.

One embodiment of a system for providing location information to a public-safety answering point during an emergency 911 call from a softphone may include a network access point configured to receive calls from softphones. A soft-switch may be in communication with the network access point, and the network access point may be configured to communicate a call from a softphone to the soft-switch. A database may be configured to store network address information of selective routers on a network through which information is communicated to public safety answering points operating to service emergency 911 calls. A gateway may be in communication with the network access point, soft-switch, and database, and, in response to receiving an emergency 911 call from the softphone via the soft-switch, the gateway may request selective router information, from the database, of a selective router through which information is to be sent to a public safety answering point servicing an area including the network access point during the emergency 911 call. The softphone, in response to receiving an indication that an emergency 911 call is connected with a public safety answering point, may communicate address location information of the softphone to the public safety answering point. In one embodiment, the address location information is communicated in a type II caller ID data packet from the softphone. A user of the softphone may be requested by the softphone to provide a current address location at which the softphone is located in response to a DHCP server providing an indication to the softphone that the softphone has changed locations.

One method for providing location information to a public safety answering point from a softphone may include receiving, at a network access point, an emergency 911 call from the softphone. The emergency 911 call may be communicated to a public safety answering point. In response to a call connection message being received, an address location of the network access point to which the softphone is in communication in placing the emergency 911 call to the public safety answering point may be communicated in a type II caller ID data packet.

One embodiment of a softphone operating on a computing device may include a telephone module configured to enable a user to place emergency 911 telephone calls. An address location update module may be configured to determine that location of the softphone has changed, request a current address location from a user of the softphone, and store the current address location. The telephone module may further be configured to look-up the current address location in response to receiving notification that an emergency 911 call is connected with a public safety answering point, and communicate the current address location to the public safety answering point.

A method for identifying location of a softphone fur use in placing emergency 911 calls may include enabling a user to place a telephone call including emergency 911 telephone calls from a softphone. A determination that location of the softphone has changed may be made. A current address location may be requested from a user of the softphone. The current address location may be stored and looked-up in response to receiving notification that an emergency 911 call is connected with a public safety answering point. The current address location may be communicated to the public safety answering point.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 1A is a block diagram of an exemplary network to enable a softphone to communicate with a PSAP and provide the PSAP with address location information of a caller using the softphone;

FIG. 1B is a block diagram of an exemplary softphone application;

DETAILED DESCRIPTION OF DRAWINGS

Figure 1C:
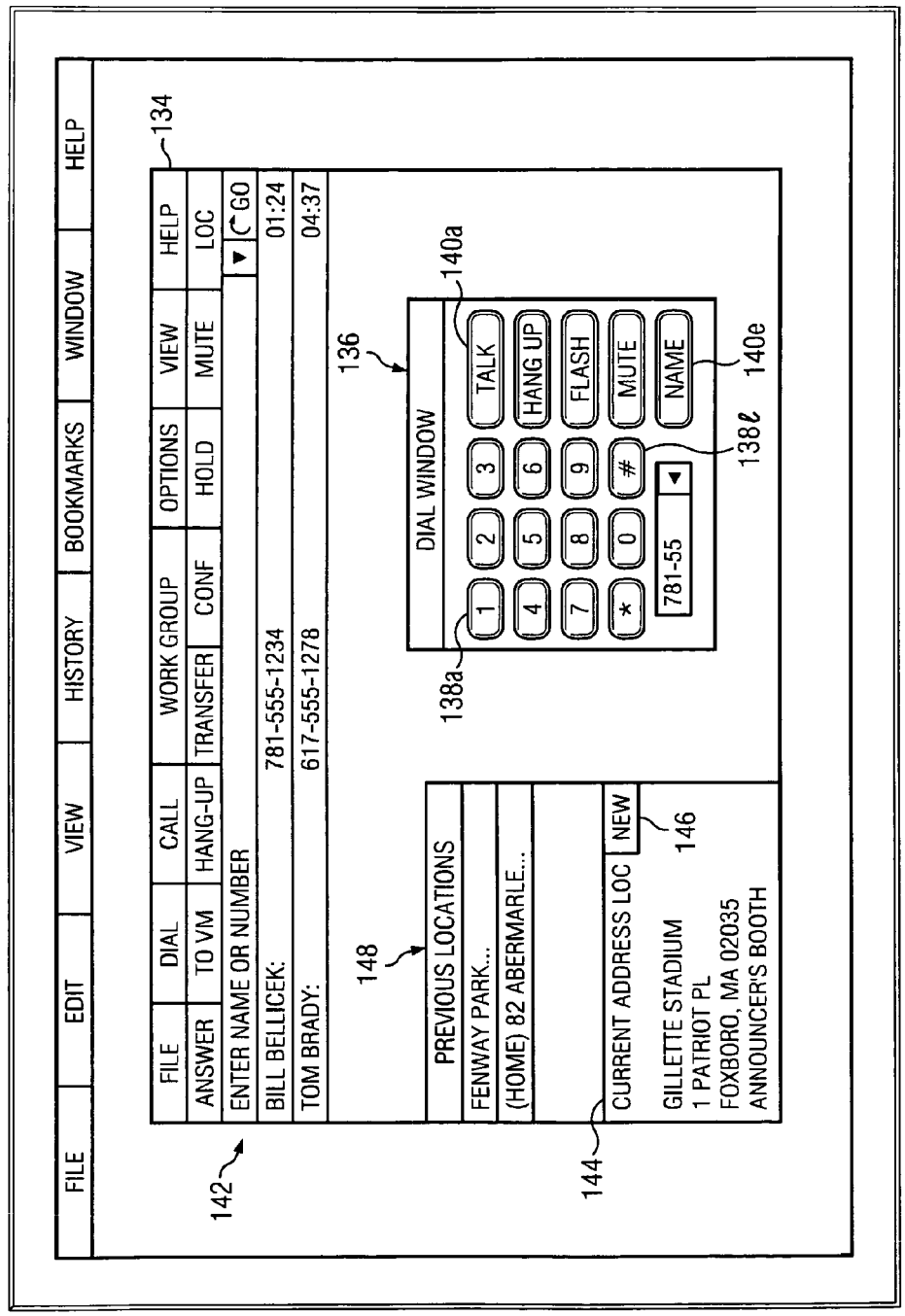
FIG. 1C is a screen shot of an exemplary user interface to enable a user to change current address location of the softphone.

FIG. 1A is a block diagram of an exemplary network 100 for enabling a user of computing device 102 with a voice interactive device 104 to operate softphone software. The computing device 102 that executes softphone software and combined with the voice interactive device 104 is considered a softphone 105, which may be used by a user to place phone calls over the network 100. As understood in the art, a softphone is a computing device that executes telephony software that enables users to place telephone calls over data networks, such as the Internet, with other softphones operating on the data networks and over telephony networks, such as the public switched telephone network (PSTN) and mobile networks via the data networks.

The network 100 may include one or more network access points 106a-106n (collectively 106) that enables the softphone 105 to access the network. The softphone 105 may communicate via the softphone using a wire or wireless connection. In one embodiment, the network access points 106a-106n are wireless and utilize an 802.11 communications protocol, which is commonly known as (WiFi) communications protocol, and may enable the softphone, if WiFi enabled, to communicate wirelessly therewith. Alternatively, other communications protocols may be utilized. An access point controller and gateway ("Gateway") 108 may be in communication with each of the access points 106. The controller may operate to register each of the access points 106 to enable communications from the access points 106 to be recognized and processed. The gateway 108 may be in communication with or operate a soft-switch 110, which is software that operates to receive and route calls from softphones and other network devices. The controller 108 may also be in communication with a database 112 that stores network addresses of selective routers located on the network 100.

As understood in the art, the PSTN includes many selective routers that are associated with thousands of PSAPs in the United States. Because there are so many selective routers and PSAPs located on the PSTN, the gateway 108 has to determine which selective router to send information to handle an emergency 911 call being placed via a network access point. The database 112 that stores the network address information of selective routers associated with PSAPs servicing an area which the network access points 106 are located enables the gateway 108, in response to receiving an emergency 911 call, to route information to the correct PSAP to handle the emergency 911 call.

A local exchange carrier selective router 114, which is one of many selective routers located on the PSTN, is used to route emergency 911 calls to PSAPs. The selective router 114 may be in communication with a selective router database 116, which operates to manage network address information of PSAPs 118 that service emergency 911 calls for geographic locations in which the network access points 106 are operating. A PSAP 118 is used to receive emergency 911 calls from the public. As shown, the PSAP 118 may receive calls from softphones, such as softphone 105. Automated location identifier (ALI) engine 120 may receive GPS information from the PSAP 118 and determine specific address location information closest to or at the GPS coordinates received from the PSAP. The ALI 120 may be local or remote, but a remote ALI may be operated by a third-party on a mainframe computer and have increased capabilities over a local ALI.

A dynamic host configuration protocol server (DHCP) 122 may be in communication with the gateway 108. As understood in the art, DHCP is a set of rules used by communications devices, such as a computer, router, or network adapter, to enable communications devices to request and obtain unique IP addresses from a DHCP server, such as DHCP server 122, that has a list of IP addresses available for assignment. In the event that DHCP server 122 or controller 108 determines that a computing device, such as computing device 102, on which a softphone is operating has changed locations or IP addresses, a request or command may be issued from the DHCP server 122 to the softphone 105 to request that a user enter a new address location for the softphone 105.

FIG. 1B is a block diagram of an exemplary softphone software application 124 that may be executed on a computing device, such as computing device 102. The softphone software application 124 may include a telephone module 126 and address location update module 128. It should be understood that each of the modules 126 and 128 may include additional and more specific modules that perform functions to enable each of the modules 126 and 128 to operate as a softphone. For example, current GPS location module 130 and generate type II caller ID module 132 may be utilized to determine current GPS coordinates and generating type II caller ID data packets.

The telephone module 126 is configured to enable a user to be able to place and receive telephone calls from a computing device, such as computing device 102. The telephone module 126 may provide a graphical user interface that displays digit and function keys to enable a user to dial a phone number, select previously dialed phone numbers, answer incoming calls, adjust volume, select voice interactive device (e.g., wired and wireless headsets), receive and manage voicemails, select call waiting calls, perform three-way calling, set call forwarding, or perform any other telephony operation. The telephone module 126 is configured to enable a user to place an emergency 911 call by pressing a single function key (e.g., "911" key) or dial 9-1-1 and press a dial soft-button, as normally done. The telephone module 126 may further be configured to look-up the current address location of the softphone in response to receiving notification that an emergency 911 call is connected with a public safety answering point and communicate the current address location to the public safety answering point.

The address location update module 128 may be configured to manage address locations that the softphone has been and set current addresses in response to a signal or command indicative of the softphone changing location based on being assigned a different IP address than previously assigned or otherwise. The address location update module 128 may automatically request a current address location from a user of the softphone by prompting the user with a text entry field, map interface, or any other graphical user interface function or feature. In addition, the address location update module 128 may be manually activated in response to a user requesting to provide a current address location. The address location update module 128 may access a local or remote database that includes previous address locations at which the softphone was located to enable a user to simply select from a list of previous address locations, thereby simplifying entering a current address location for the user. In one embodiment, the list is a drop down list, as further described with regard to FIG. 1C.

Current GPS location module 130 may enable the softphone to access a current location from a GPS receiver or other location determination module (e.g., triangulation) configured within the computing device. Generate type II caller ID module 132 may be configured to generate type II caller ID data packets. In accordance with the principles of the present invention, when the softphone software application 124 is being utilized to place an emergency 911 call, the generate type II caller ID module 132 may include current address location in a name data field, thereby causing the current address location of the softphone to be displayed on a type II caller ID device at the PSAP.

FIG. 1C is a screen shot of an exemplary softphone user interface 134 to enable a user to change current address location of the softphone. A keypad interface 136 may enable to press number keys 138a-138l to dial a telephone number, such as 911, and feature codes, such as *67 (block caller ID). Function keys 140a-104e may also be included in the user interface 134 to enable the user to perform certain functions that are conventional and/or particular to softphones. For example, a "talk" function key 140a may enable a user to initiate a call or dial a telephone number after entering the telephone number. A "name" function key 140e may enable a user to associate a name with a telephone number, such as "Tom Brady" with telephone number 617 555-1278, thereby enabling the user to select, sort, or search for a name for selection to place a telephone call to the named telephone number. As shown, the named telephone numbers may be alphabetically listed in a list 142.

A current address location section 144 may show a current address location of the softphone. A "new" softbutton 146 may enable a user to manually enter or select a new address location in which the softphone is located. A previous locations list 148 may be displayed to enable the user to select a location at which the softphone was located. If the user is at a location not previously located, he or she may be provided with an address location entry template (not shown) in which the address location, including name (e.g., stadium, airport, building, etc.), street address, floor, terminal, office, city, state, and zip code may be entered. It should be understood that a wide variety of address location information fields may be provided in the address location entry template for the user to enter the address location.

Figure 2:
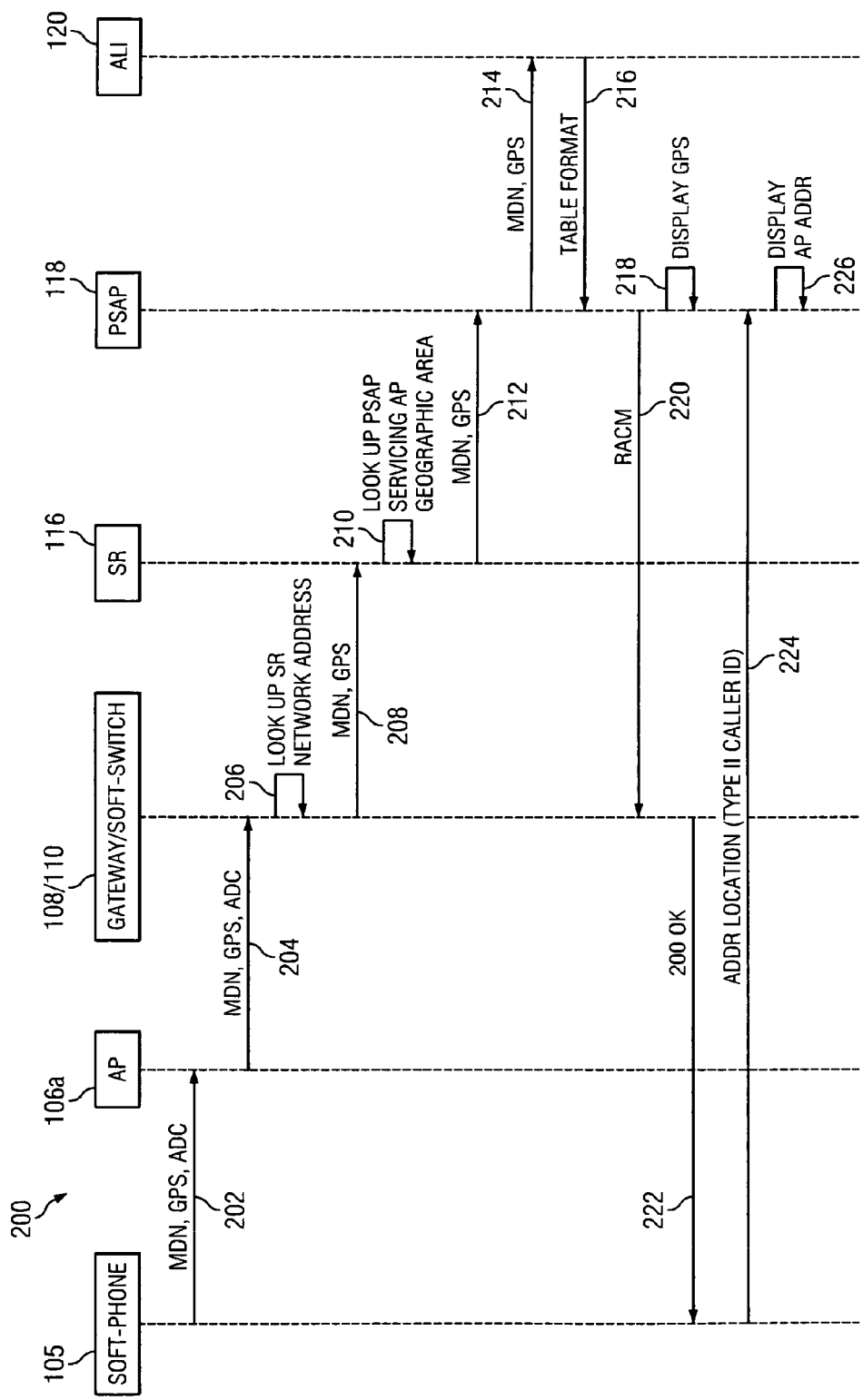
FIG. 2 is another exemplary network showing signals communicating location information of a user using a softphone.

FIG. 2 is another exemplary network showing signals 200 communicating location information of a user using softphone 105. In placing an emergency 911 call, the softphone 105 may communicate a mobile directory number (MDN), global positioning system coordinates (GPS), and abbreviated dialing code (ADC) to the network access point 106a at step 202. The ADC may be a code pre-defined to represent an 911 code that is used to notify the network access point 106a and gateway/soft-switch 108 that a call is an emergency 911 call. The MDN, GPS, and ADC are communicated to the gateway/soft-switch 108/110 at step 204. At step 206, the gateway/soft-switch 108/110 may look-up in a database, such as database 112 (FIG. 1), a selective router network address of selective router 116 that is in communication with public safety answering point 118 that is servicing an area in which the network access point 106a is located.

The gateway/soft-switch 108/110 may communicate the MDN and GPS information to the selective router 116 at step 208. At step 210, the selective router 116 may look-up a PSAP servicing a geographic area in which the network access point 106a is operating. The selective router 116 may communicate the MDN and GPS information to the PSAP 118 that was determined to be servicing the network access point 106a. The PSAP 118 may communicate the MDN and GPS information to the ALI 120 at step 214. In response, the ALI 120 may communicate information, including name and GPS coordinates, to the PSAP 118 in a table format for display to an operator.

At step 220, a release answer call message (RACM) that indicates that the PSAP 118 goes off-hook may be sent from the PSAP 118 or switch located in the PTSN (not shown) to the gateway/soft-switch 108/110. In response, a 200OK message, which is a data packet network analogous message to the analog network RACM message for session initiation protocol (SIP) signaling, may be communicated to the softphone 105 at step 222. At step 224, the softphone 105 may communicate an address location to the PSAP 118. In one embodiment, the softphone 105 may generate a type II caller ID data packet to the PSAP 118 by placing the address location in a name field. The softphone 105 may perform such a communication because unlike a conventional WiFi telephone, a softphone 105 is operating on a computer that is capable of generating type II caller ID data packets or any other type of data packets. At step 226, the address location may be displayed on a type II caller ID device at the PSAP 118.

Figure 3:
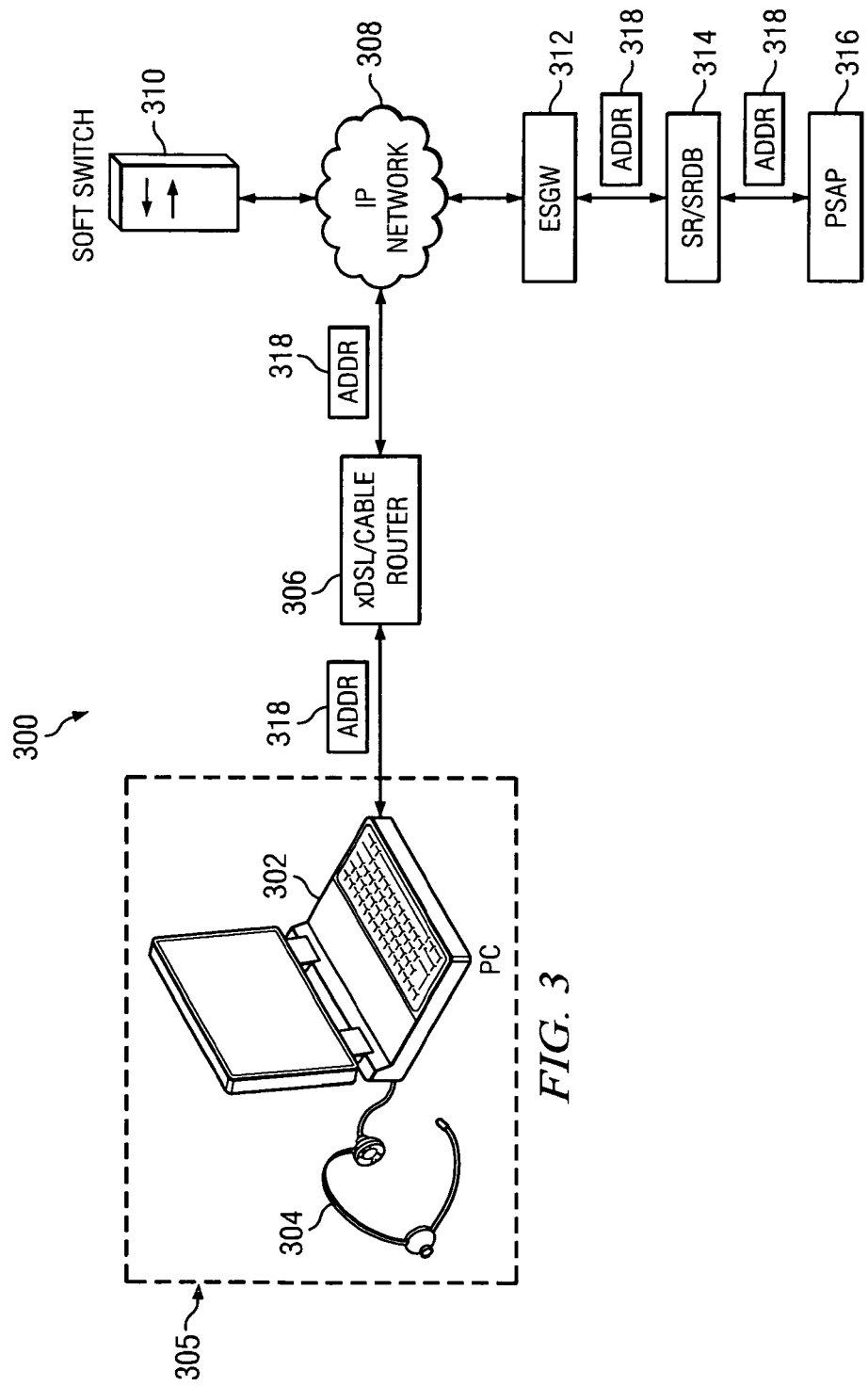
FIG. 3 is a block diagram of a softphone connecting to a network via a broadband network access point.

FIG. 3 is a block diagram of a softphone connecting to a network 300 via a broadband network access point, such as a DSL network access point. As shown, a computing device 302 with an audio interactive device 304 may operate as a softphone 305 by executing a softphone software application (not shown). A DSL/cable router 306, which are broadband access devices, may provide an interface to an IP network 308. A soft-switch 310 may be utilized to handle calls from the softphone 305, including emergency 911 calls, to determine that a call is an emergency 911 call and communicate the call via gateway 312 to selective router 314. The call is ultimately communicated to PSAP 316. In essence, the network 300 and communications thereon operate in the same or similar manner as the network shown in FIGS. 1A and 2. Address location information may be communicated in a data packet 318, such as a type II caller ID data packet, generated by the softphone 305 to the PSAP 316 in response to the PSAP going off-hook.

Figure 4:
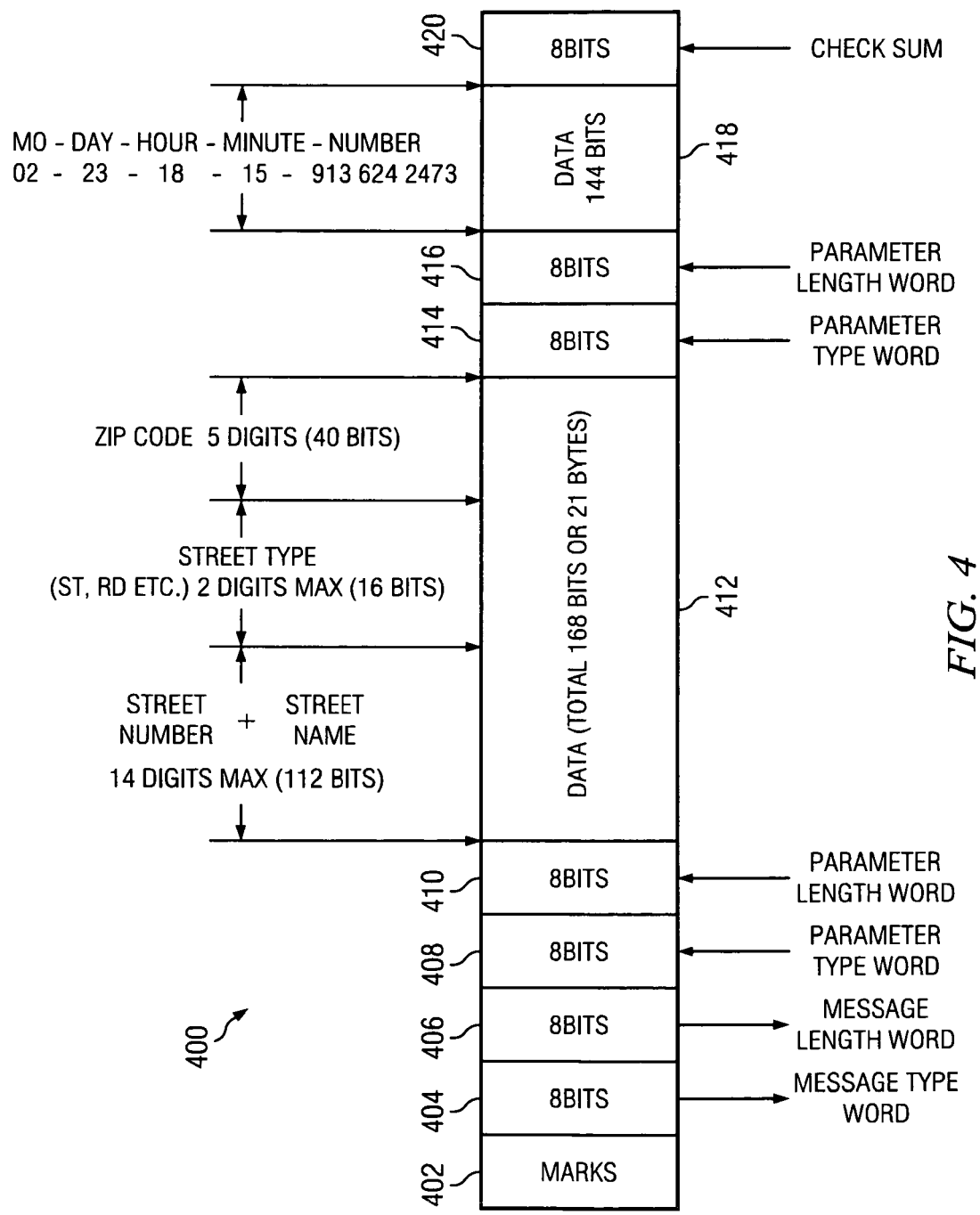
FIG. 4 is a block diagram of an exemplary signaling structure for communicating address information of a network access point in a type II caller ID data packet.

FIG. 4 is a block diagram of an exemplary signaling structure for communicating address information in a type II caller ID data packet. The signaling structure format 400 may be the same or substantially the same signaling structure as a conventional caller ID type II signaling structure as understood in the art. The signaling structure 400 includes a number of fields, including marks 402, message type 404, message length 406, parameter type 408, parameter length 410, data 412, parameter type 414, parameter length 416, data 418 and check sum 420. Although the signaling structure 400 is configured for caller ID information, such as name and telephone number to be included in data fields 412 and 418, which are 168 bits (21 characters) and 144 bits (18 characters), respectively, the principles of the present invention provide for including street number and street name (14 characters-112 bits), street type (2 characters-16 bits), and zip code (5 characters-40 bits) in the first data field 412 and date, time and phone number in the second data field 418. This FSK signaling structure 400 may be generated by a softphone from address location information stored in the softphone and included in the first data field 412. It should be understood that the format 400 is exemplary and that each of the data fields 412 may be allocated with different address information having different number of characters or bits assigned thereto.

More specifically, the address parameter may be ASCII equivalent of the characters that represent the address associated with the calling access line. The character subfields may be coded in 8-bit ASCII (no parity) with one octet per character. No characters (e.g., spaces, commas, periods, etc.) are assumed and the relevant characters are sent. The first character of the address may be transmitted first and subsequent characters may be transmitted in order until the last character is transmitted. For example, the address "12345John Rd" may be coded over 12 octets as 00110001, 00110010, 00110011, 00110100, 00110101, 01001010, 01001111, 01001000, 01001110, 00100000 (space), 01010010, and 01000100. If the street number plus the street name combined is more than 14 characters, then the characters after 14 characters are ignored by the system. If the street number plus the street name combined occupies 11 characters then one space may be put before the street name, one space before the street type, and another space before the street code. If the street number plus the street name combined occupies 12 characters, then one space may be put before the street name and another space may be put before the zip code. If the street number plus the street name combined occupies 13 characters, then one space may be put before the street name. To minimize the total length of the displayed address message on the public-safety answering point side, no more than one space is put before the street name, street type, or zip code. If the street number plus the street name combined occupies 14 characters, then no spaces are included. Additional description of the signaling structure format 400 and communication thereof is described in co-owned U.S. Pat. No. 8,014,341 issued Sep. 6, 2011, which is incorporated herein by reference in its entirety.

Figure 5:
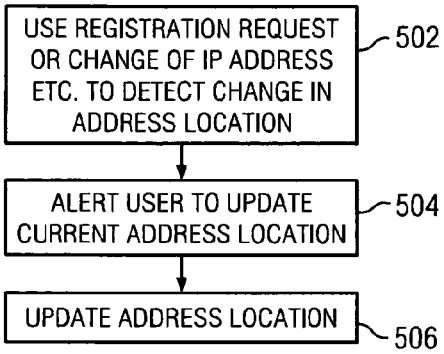
FIG. 5 is a flowchart of an exemplary process for updating current location information of a softphone.

FIG. 5 is a flowchart of an exemplary process 500 for updating current location information of a softphone. The process 500 may start at step 502, where the softphone may use (i) a registration request from a network access point or controller of a gateway or (ii) change of IP address as determined from a DHCP server or otherwise to detect a change in address location. In response, the softphone may alert a user to update current address location at step 504. In alerting the user, a pop-up window or status notification message may be displayed and/or audio signal may be played. At step 506, the user may update the address location at the softphone so that, if an emergency 911 call is placed while at the address location, the address location may be communicated to a PSAP.

Figure 6:
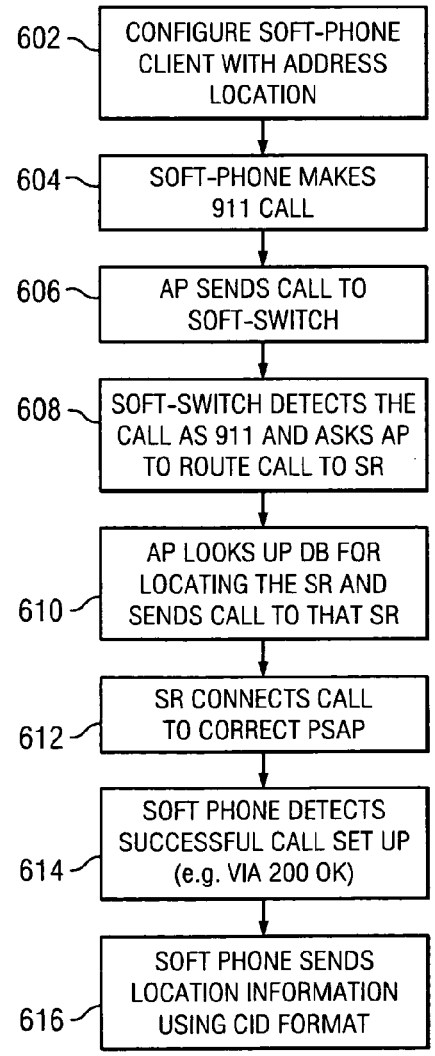
FIG. 6 is a flowchart of an exemplary process for a softphone being connected with a PSAP and communicating address location information of a network access device to the PSAP using a type II caller ID data packet.

FIG. 6 is a flowchart of an exemplary process 600 for a softphone being connected with a PSAP and communicating address location information of a network access device to the PSAP using a type II caller ID data packet. The process 600 starts at step 602, where a softphone software application or client is configured with a current address location. At step 604, an emergency 911 call may be made from the softphone and received at a network access point, which may or may not be a broadband network access point. At step 606, the network access point sends the emergency 911 call to a soft-switch, which, in turn, detects the call as an emergency 911 call and sends a request or command to the network access point to route the call to a selective router associated with an PSAP that is servicing the network access point at step 608. In routing the call to the selective router, the network access point looks-up in a database the correct selective router to which to send the call. At step 612, the selective router connects the emergency 911 call to the correct PSAP that the selective router determines to be servicing the area in which the network access point is operating. In response to the PSAP going off-hook in answering the emergency 911 call, the softphone may detect a message, such as a 200OK message, to notify the softphone of a successful call set-up. At step 616, the softphone may send address location information using a type II caller ID data packet. If the softphone is a fixed location softphone (e.g., if operating on a desktop computer rather than a portable computer), then an ALI, either local or remote, may look up the address at which the softphone is located.

The above description has been presented for purposes of illustration and description, and is not intended to be exhaustive or limited to the illustrative embodiments in the form disclosed. Many modifications and variations will be apparent to those of ordinary skill in the art.

What is claimed is:

1. A system for providing location information to a public-safety answering point during an emergency 911 call from a softphone, said system comprising:
   a network access point configured to receive calls from softphones;
   a soft-switch in communication with said network access point, said network access point configured to communicate a call from a softphone to said soft-switch;
   a database configured to store network address information of selective routers on a network through which information is communicated to public safety answering points operating to service emergency 911 calls; and
   a gateway in communication with said network access point, soft-switch, and database, and, in response to receiving an emergency 911 call from the softphone via said soft-switch, request selective router information, from said database, of a selective router through which information is to be sent to a public safety answering point servicing an area including said network access point during the emergency 911 call, the softphone, in response to receiving an indication that an emergency 911 call is connected with a public safety answering point, being configured to communicate address location information of the softphone to the public safety answering point in a caller ID data packet including a field of the caller ID packet modified to include address location information by replacing a field of the caller ID data packet with the address location information while leaving another field of the caller ID data packet unmodified.

2. The system according to claim 1, wherein the address location information is communicated in a type II caller ID data packet.

3. The system according to claim 1, wherein the softphone is configured to update the address location information in response to determining a change in position or IP address.

4. The system according to claim 1, wherein the softphone is configured to enable a user to enter an updated address in response to a DHCP server issuing a new IP address to the softphone.

5. The system according to claim 1, wherein said network access point is a WiFi network access point.

6. The system according to claim 5, wherein the WiFi network access point is configured to receive VoIP calls from the softphones.

7. A method for providing location information to a public safety answering point from a softphone, said method comprising:
   receiving, at a network access point, an emergency 911 call from a softphone;
   communicating the emergency 911 call to a public safety answering point; and
   communicating, in response to a call connection message being received, an address location of the softphone to the public safety answering point, the address location being communicated in a caller ID data packet including a field of the caller ID packet modified to include address location information by replacing a field of the caller ID data packet with the address location information while leaving another field of the caller ID data packet unmodified.

8. The method according to claim 7, wherein communicating the address location in a caller ID data packet includes communicating a type II caller ID data packet from the softphone.

9. The method according to claim 7, further comprising routing the emergency 911 call via a soft-switch to a gateway.

10. The method according to claim 7, further comprising looking up a network address of a selective router to which the public safety answering point is in communication.

11. The method according to claim 7, further comprising communicating GPS information received from the softphone to the public safety answering point.

12. The method according to claim 7, wherein receiving the emergency 911 call includes receiving the emergency 911 call using a WiFi communications protocol.

13. The method according to claim 7, further comprising updating the address location of the network access point in response to determining that the location of the softphone has changed.

14. A computing device comprising:
   a telephone module configured to enable a user to place emergency 911 telephone calls;
   an address location update module configured to:
      determine that location of the softphone has changed;
      request a current address location from a user of the softphone;
      update the current address location; and
      store the updated current address location;
   said telephone module further configured to:
      look-up the current address location in response to receiving notification that an emergency 911 call is connected with a public safety answering point; and
      communicate the current address location to the public safety answering point in a caller ID data packet including a field of the caller ID packet modified to include address location information by replacing a field of the caller ID data packet with the address location information while leaving another field of the caller ID data packet unmodified.

15. The computing device according to claim 14, further comprising a type II caller ID module configured to generate a type II caller ID data packet with the address location information.

16. The computing device according to claim 14, wherein the address location update module is further configured to present previous address locations at which the softphone was located to enable a user to select from the previous address locations to identify a current address location.

17. A method for identifying a location of a softphone for use in placing emergency 911 calls, said method comprising:
   enabling a user to place a telephone call including emergency 911 telephone calls from a softphone;
   determining that a location of the softphone has changed;
   requesting a current address location from a user of the softphone;
   storing the current address location;
   looking-up the current address location in response to receiving notification that an emergency 911 call is connected with a public safety answering point; and
   communicating the current address location to the public safety answering point in a caller ID data packet including a field of the caller ID packet modified to include address location information by replacing a field of the caller ID data packet with the address location information while leaving another field of the caller ID data packet unmodified.

18. The method according to claim 17, further comprising generating a type II caller ID data packet with the address location information.

19. The method according to claim 17, further comprising presenting previous address locations at which the softphone was located to enable a user to select from the previous address locations to identify a current address location.

\* \* \* \* \*